(12) United States Patent
Baasch et al.

(10) Patent No.: US 7,288,040 B2
(45) Date of Patent: Oct. 30, 2007

(54) METHOD FOR CONTROLLING THE DRIVE TRAIN OF A VEHICLE

(75) Inventors: Detlef Baasch, Friedrichshafen (DE); Christoph Pelchen, Tettnang (DE); Barbara Schmohl, Friedrichshafen (DE); Unal Gazyakan, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 121 days.

(21) Appl. No.: 10/524,796

(22) PCT Filed: Aug. 16, 2003

(86) PCT No.: PCT/EP03/09073

§ 371 (c)(1),
(2), (4) Date: Feb. 17, 2005

(87) PCT Pub. No.: WO2004/018251

PCT Pub. Date: Mar. 4, 2004

(65) Prior Publication Data

US 2006/0166786 A1    Jul. 27, 2006

(30) Foreign Application Priority Data

Aug. 21, 2002  (DE) ................. 102 38 128

(51) Int. Cl.
*F16H 31/00* (2006.01)

(52) U.S. Cl. ....................... 475/138; 477/107
(58) Field of Classification Search ........... 475/122, 475/123, 125, 126, 138; 477/107, 109; 74/339

See application file for complete search history.

(56) References Cited

U.S. PATENT DOCUMENTS 4,677,879 A    7/1987  Furusawa et al.

(Continued)

FOREIGN PATENT DOCUMENTS

DE    197 22 480 A1    12/1997

(Continued)

*Primary Examiner*—Roger Pang
(74) *Attorney, Agent, or Firm*—Davis Bujold & Daniels, P.L.L.C.

(57) ABSTRACT

Disclosed is a method for controlling a drive train (1) of a motor vehicle, especially an off-road vehicle, comprising a drive engine (2), a multi-group transmission (4), an output and a control device. The multi-group transmission (4) consists of at least one automatic gearbox (8) and a downstream range-change unit (9). When a modification occurs in the multiplication of the range-change unit (9), a) the drive train is relieved by modifying the torque of the drive engine (2), a shift element (24, 25) to be switched off in said range-change unit (9) is disconnected, c) a shift element (24,25) to be switched on in said range-change unit is synchronized and switched on and d) a multiplication of the automatic gearbox (8) is modified in such a way that the modification of the multiplication of the multi-group transmission (4) is smaller than a single modification of the multiplication of the range-change unit (9). A rotational speed of the drive engine (2) is adjusted by a modification in the transmissibility of at least one shift element of the automatic gearbox (8) to a coupling rotational speed equivalent to the adjusting multiplication of the multi-group transmission (4) at which the shift element to be switched on in the range-change unit (9) is synchronous.

11 Claims, 9 Drawing Sheets

U.S. PATENT DOCUMENTS

| | | |
|---|---|---|
| 4,793,217 A | 12/1988 | Morisawa et al. |
| 5,005,442 A | 4/1991 | Sakakabara et al. |
| 5,425,284 A | 6/1995 | Davis |
| 5,522,777 A * | 6/1996 | Baxter et al. ................ 477/36 |
| 5,588,935 A * | 12/1996 | Osinski et al. ............. 477/107 |
| 5,924,957 A | 7/1999 | Yasue et al. |
| 6,002,976 A | 12/1999 | Hollstein et al. |
| 2002/0088291 A1* | 7/2002 | Bowen ....................... 74/339 |
| 2003/0228954 A1* | 12/2003 | Runde et al. ............... 477/107 |
| 2004/0220007 A1* | 11/2004 | Pelchen et al. ................ 475/5 |
| 2004/0220009 A1* | 11/2004 | Yu et al. .................... 475/198 |

FOREIGN PATENT DOCUMENTS

| | | |
|---|---|---|
| DE | 197 47 262 A1 | 5/1999 |
| DE | 694 17 321 T2 | 11/1999 |
| EP | 0 601 645 A1 | 6/1994 |
| EP | 0 867 643 A2 | 9/1998 |
| EP | 0 911 553 A1 | 4/1999 |
| EP | 0 947 739 A2 | 10/1999 |
| EP | 0 947 741 A2 | 10/1999 |
| GB | 2 304 835 A | 3/1997 |
| JP | 63266266 A | 11/1988 |

* cited by examiner

METHOD FOR CONTROLLING THE DRIVE TRAIN OF A VEHICLE

This application is a national stage completion of PCT/EP2003/009073 filed Aug. 16, 2003 which claims priority from German Application Serial No. 102 38 128.3 filed Aug. 21, 2002.

FIELD OF THE INVENTION

The invention concerns a method for the control of a drive train of a vehicle.

BACKGROUND OF THE INVENTION

In practice, a driving torque generated by a drive machine is conducted through a transmission unit to an output means of a vehicle. This operation is made possible in that the motor, the transmission unit and the output means compose a so-called drive train, which is regulated by way of a controlling apparatus.

In order to be able to furnish as many gear stages as possible with the least number of available gear-pairings, the transmission unit is designed as a multi-group transmission which, in turn, consists of a plurality of several transmission groups, which are placed separately in series-aligned arrangement. Where the transmission groups are concerned, it is generally to be understood that such grouping comprises pre-shift gearing, the main transmission and subsequent groups, whereby the latter are subsequently referred to as "range groups". If the case is that a main transmission of a multi-group transmission is designed as an automatic transmission then a greater driving comfort is acquired if a multiplicity of gear stages are provided. Such an automatic transmission can, for example, possess six gear ratio stages for forward motion and one gear ratio stage for reverse travel.

A range group of a multi-group transmission, described by one input speed of rotation of the range group is always placed in the slow gear stage, where a substantial speed of rotation increase takes place simultaneously. In order to avoid conducting a large start-up moment produced by a range group through the main transmission, range groups are advantageously located following (in the direction of power flow) the main transmission of a multi-group transmission. On this account, a range group of the multi-group transmission is often designed in practice as an auxiliary transmission group or as a planetary transmission group. In such arrangements, a planetary transmission shows itself as a more compact assembly in comparison to an auxiliary transmission group.

A change of a ratio in a range group is executed by a shifting element, whereby shifting can be made between a first ratio "low" and a second ratio "high". With this arrangement and when in a first selected low gear of the range group and in combination with the main transmission, the driver has a choice of ratios available which are an advantage for operation of a vehicle in a terrain characterized by steep climbs and wherein slow vehicle speeds are acceptable.

The second ratio "high" of the range group is less subject to losses, so that when traveling under normal conditions of terrain and also at higher driving speeds, shifting into the second ratio "high" is to be preferred.

Further, a change of a ratio in a range group activates a considerable jump of ratios in the range group as well as the ratio of the entire multi-group transmission. If an output speed remains essentially the same during the shifting then an extremely large difference in speed of rotation is brought about between the input speed of the motor before the shifting and the input rotational speed of the motor in the "new" ratio of the multi-group transmission, wherein a closable shifting element of the range group is synchronous, relative to the output speed of rotation. In any case, such extreme differences in rotational speeds cause longer time periods for speed equalization, during which time, the driving torque of the motor changes for the very purpose of compensating the differing speed of rotation of the motor. The result is long shifting periods or extended periods of interrupted traction. This becomes a problem since the speed of rotation of the motor must then be reduced.

In order to shorten the shifting periods, a decision was made to the effect that during a change of the ratio of the range group, an identical shift is to be brought about in the main transmission simultaneously. Since this results in a ratio change in the multi-group transmission, the differential of said speeds of rotation is reduced.

However, the disadvantage of this operation is that the torque of the motor is not sufficient to compensate to a different motor speed of rotation within a sufficiently brief time, so that shifting with short-time traction interruption can be achieved. This causes a driving operation up steep inclines to be greatly disadvantaged.

Thus, the purpose of the present invention is to provide a method for the control of a drive train, wherein ratio changes in a range group can be executed with brief traction interruptions.

SUMMARY OF THE INVENTION

Upon a change of the ratio of the range group, if a speed of rotation of the motor is set with the invented method, this would be done by means of a change of a transfer capability of at least one shifting element of the automatic transmission to one of the ratios of the multi-group transmission's equivalent connective speeds of rotation, with which the shifting element of the range transmission group is in synchronous agreement, whereby a traction interruption period would be advantageously essentially shortened.

The reason for this is that, in a case of an increase of a transfer capability of a brake of the automatic transmission, the motor (if required) can be braked and the comparison of the different speeds of rotation, between the motor speed of rotation prior to the point of shifting and, at that the point of time of the shift itself, is done essentially more rapidly than would be the case if the speed of rotation differential was balanced out by a reduced torque of the motor caused by its own tractive moment.

The advantageous counter shifting which is associated with the establishment of the above transferability of at least one shifting element in the automatic transmission leads, additionally, to a changing of the ratio of the range group as well as to a reduction of the difference of speeds of rotation between, first, the rotational speed of output ratio of the motor of the output speed of rotation of the multi-group transmission and, second, the new ratio to be achieved by the multi-group transmission. Thereby, a very short traction interruption can be attained.

In an advantageous variation of the method, according to the invention, provision is made that in the case of a ratio change of the range group, a synchronization of a closable shifting element of the range group is effected by way of controlling the shifting elements of the automatic transmission. In this way and in an advantageous manner, the mechanical synchronization within the range group—even if said mechanical synchronization is present as a separate component or integrated into the range group—can be eliminated. The advantageous possibility remains that a range group, in comparison to the multi-group transmissions known in the practice, can be assembled at a decidedly lesser expense. A further advantage is that the invented range group essentially requires, essentially, a considerably smaller installation space.

Further the synchronization of the range group upon a change of its ratio by way of the automatic transmission has the advantage that shifting elements of the range group can be fabricated and installed as force fit shifting elements, preferably as castellated dog clutches. With such a design, high torques can be transmitted, small installation space is required and thereby lesser manufacturing costs are incurred.

An additional advantage is that by the omission of the mechanical synchronization in the range group, a synchronization by tractive-torque is also eliminated and, consequently, heat generation in the group is essentially removed. In the case of mechanical synchronization, the moment of tractive force arises essentially by liquid viscosity, which is generated in oil and interposes itself between friction coatings of friction responsive clutches and/or brakes.

Yet another advantageous quality of the invented method is that interruptions in continuance of power delivery time are considerably reduced because of the synchronization of the range group by the automatic transmission in comparison to the process now known in practice. This advantage is due to the action of a change of motor rotational speed, now being related to a need for and effected by appropriate control of automatic transmission shifting elements, which operation can now be carried out more quickly and in a less complicated manner.

BRIEF DESCRIPTION OF THE DRAWINGS

The invention will now be described, by way of example, with reference to the accompanying drawings in which.

DETAILED DESCRIPTION OF THE INVENTION

Figure 1:
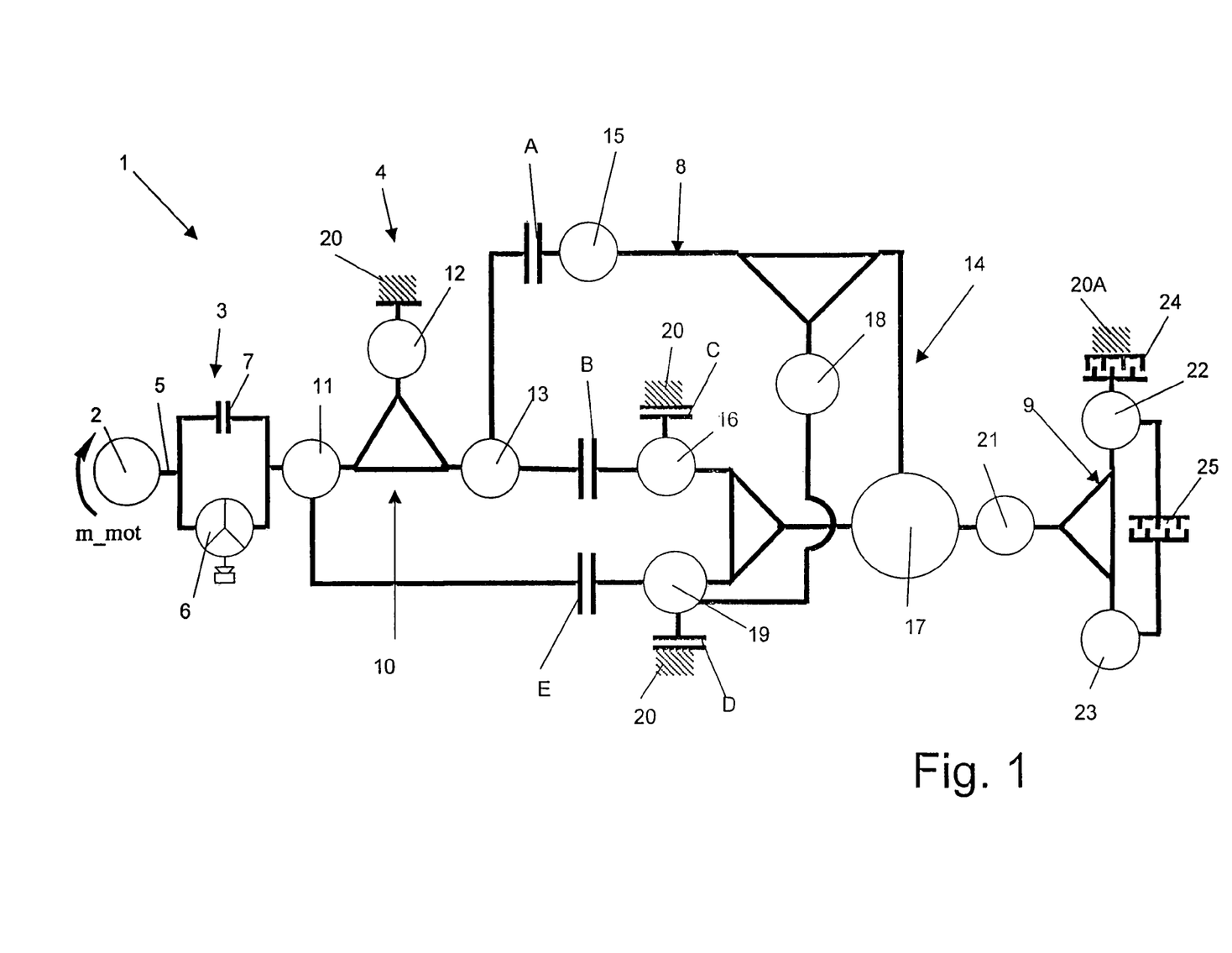
FIG. 1 a schematic presentation of a drive train with a motor, a starting element and a multi-group transmission consisting of an automatic transmission and range group.

FIG. 1 schematically shows a drive train 1 of a vehicle, preferably an all-terrain vehicle, which is not further described. The drive train 1 consists of a motor 2, a start-up element 3 and a multi-group transmission 4. The driving machine is designed as an internal combustion motor 2, the drive moment $m_{mot}$ of which is transmitted through an output drive shaft 5 onto which is connected the start-up element 3, which is preceded by a hydrodynamic torque converter 6. Additionally, the start-up element 3 is constructed with a controlled converter clutch 7, with which the hydrodynamic torque converter 6 can be bypassed.

The multi-group transmission 4 which, series-wise in direction of powerflow, follows the start-up element 3 is assembled from an automatic transmission 8 and a subsequently connected range group 9, whereby the automatic transmission 8 represents the principal transmission of the multi-group transmission 4.

The presented transmission combination of the multi-group transmission 4 consists, as shown, of the load-switching automatic transmission 8 and a dog clutch connected gear string with reduction gear stages, which composes the range group 9 having automatic activation. This transmission combination is provided with an electronic control system, which is formed, first, from an automatic transmission control apparatus; second, from a range group regulator and, third, from a motor control device.

These three control devices, which are not explained in any greater detail here, are interconnected with one another and, accordingly, exchange the control signals of the drive train 1 among themselves. By way of a coordinated control of the automatic transmission 8 and the range group 9, the constantly meshed range group 9 becomes synchronized with the automatic transmission 8. The synchronization of the range group 9, i.e., the synchronization of that element of the range group 9 which is to be shifted, is carried out by an appropriate control of shifting elements A to E of the automatic transmission 8.

The automatic transmission 8 possesses a first planetary gear set 10, wherein an internal gear 11 of this first planetary gear set 10 is connected to the start-up element 3. More than one planetary gears roll between the internal gear 11 and a sun gear 12 of the first planetary gear set 10 and are rotationally guided on a planetary gear carrier 13. The planetary gear carrier 13 of the first planetary gear set 10 is connected to the shifting element A as well as to the shifting element B, whereby the shifting elements A and B are designed as frictional disk clutches.

The internal gear 11 of the first planetary gear set 10 is also connected to a frictional disk clutch-type shifting element E. By way of the shifting elements A, B and E, respectively, a connection can be created between the first planetary gear set 10 and a second planetary gear set 14, which planetary gear set 14 can be designed as a double planetary gear set, which essentially corresponds to a Ravigneaux type planetary gear set.

The second planetary gear set 14 possesses a first sun gear 15 as well as a second sun gear 16 whereby, between the first sun gear 15 and a common internal gear 17, as well as between the second sun gear 16 and the common internal gear 17, respectively, a plurality of planetary gears roll, which said planetary gears are rotatably secured by a first planetary gear carrier 18 or a second planetary gear carrier 19 of the second planetary gear set 14.

The sun gear 12 of the first planetary gear set 10 is firmly secured by being affixed to a housing 20 of the automatic transmission 8. The second sun gear 16 of the second planetary gear set 14 is advantageously bound to the transmission housing 20 by shifting element C, which shifting element C is constructed as a friction disk brake. Moreover, the second planetary gear carrier 19 of the second planetary gear set 14 can be immovably affixed to the transmission housing 20 by shifting element D, which, again is constructed as a friction disk brake or can be directly connected to the transmission housing 20 as an alternate.

The common internal gear 17 of the second planetary gear set 14 is bound to a sun gear 21 of the range group 9, whereby, between the sun gear 21 and an internal gear 22 of the range group 9, a plurality of planetary gears roll, which have been rotationally secured upon a planetary gear carrier 23 of the range group 9, which is connected to the output drive.

For a presentation of a first ratio "low" of the range group 9, the internal gear 22 of the range can be connected in such a manner with a transmission housing 20A of the range group 9, by a first shifting element 24, that the internal gear 22 is not rotatably connected with the transmission housing 20A. A second ratio stage "high" of the range group 9, located between the internal gear 22 and the planetary carrier 23, is then actuated when the first shifting element 24 is opened, i.e., released and a second shifting element 25 of the range group 9 is closed and the internal gear 22 binds with the planetary carrier 23.

Figures 2, 3:
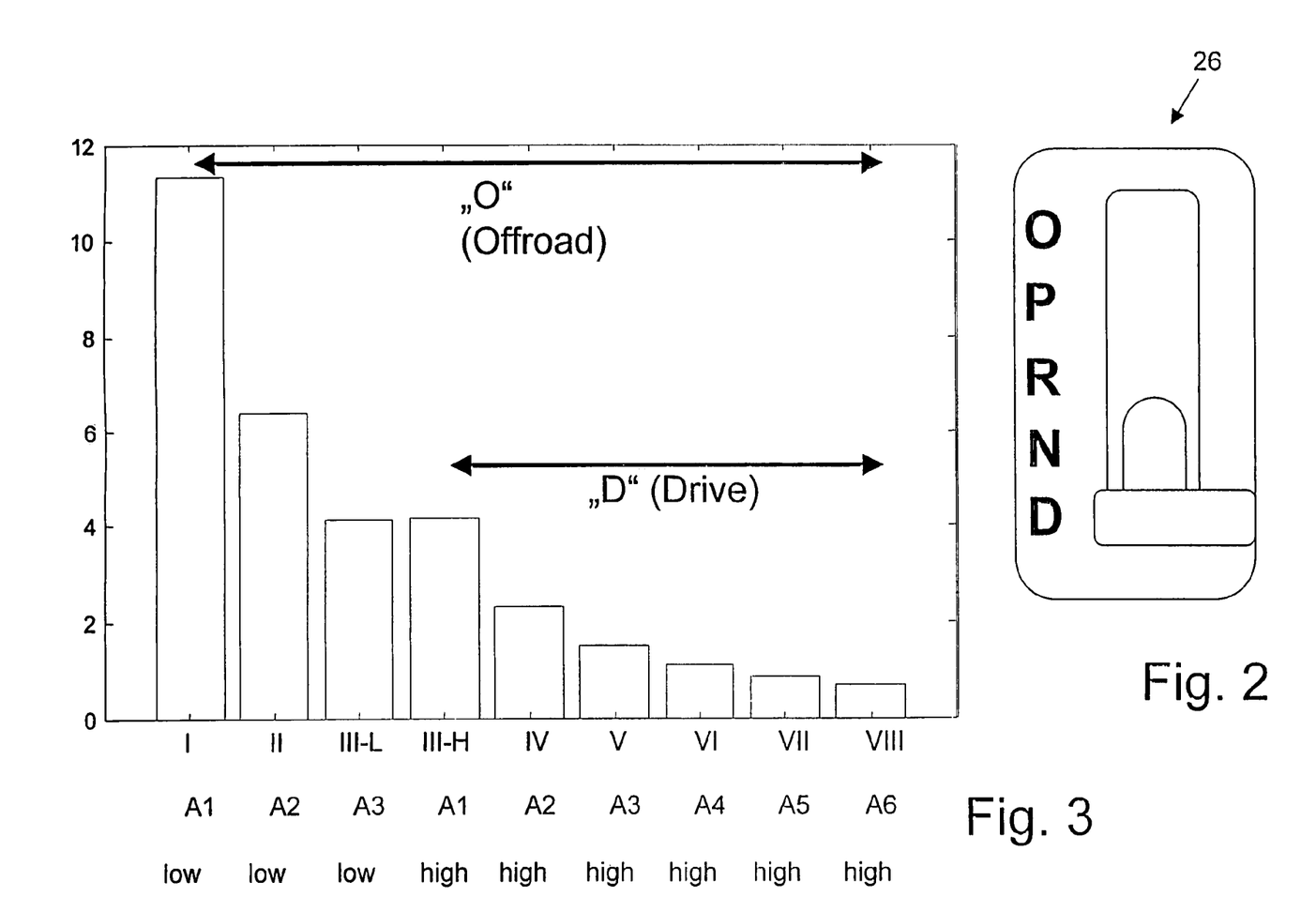
FIG. 2 a schematically presented selective lever for an automatic transmission with a shift-selector, which exhibits an off-road position.
FIG. 3 a bar chart in which ratios of a multi-group transmission are presented in relation to the ratios of an automatic transmission and a range group.

By an automatic drive lever 26, as shown in FIG. 2, the driver has several possibilities at his disposal. With this equipment, various positions "O", "P", "R", "N" and "D" of the automatic transmission selection lever 26 are possible which, by means of a labeled notch scale, can be differentiated by the driver. In the "Position O" (i.e., "off-road") and in the "Position D" (i.e., "drive") of the automatic transmission selection lever 26, a driving direction, respectively "forward travel" of the vehicle can be selected. The position "P" (i.e., "park") allows the vehicle to remain standing, whereby the output drive of the vehicle is blocked. The position "R" (i.e., "reverse") permits shifting into backward motion and in the position "N" (i.e., "neutral") the flow of power of the drive train 1 from the motor 2 to the output drive of the vehicle is interrupted in the area of the multi-group transmission 4.

The positions "O" and "D", associated functions of the automatic transmission selection lever 26 for forward travel, differentiate themselves therein, in that by the chosen lever position "D" in the range group 9 the ratio "high" is established and, as may be seen in FIG. 3, makes ready for the driving operation of six gear stages, namely "III-H", "IV", "V", "VI", "VII" and "VIII" of the multi-group transmission 4 dependent upon the respective ratios "A1", "A2", "A3", "A4", "A5" or "A6" of the automatic transmission 8. The overall series of ratios of the multi-group transmission 4 then would be found within the values in a range of 4.17 to 0.69, for example.

An intershift between the individual gear stages "III-H", "IV", "V", "VI", "VII" and "VIII" of the multi-group transmission 4 is carried out by a change of the ratio of the automatic transmission 8 which, advantageously, is in accord with a preselected or with a specified shifting program which, for example, has been input into the control apparatus of the multi-group transmission 4 or the control of the automatic transmission 8.

Should a driver choose by means of the above discussed selection lever 26, the position "O" is then possible by means of the multi-group transmission 4 to make use of gear stages "I", "II" and "III-L" besides the gear stages "III-H", "IV", "V", "VI", "VII" and "VIII" of the multi-group transmission 4. The gear stages "I". "II", and "III-L" then become available, if, in the range group 9, the ratio "low" is set and in the automatic transmission 8, respectively a first ratio "A1", a second ratio "A2" or a third ratio "A3" is shifted into. A ratio of the multi-group transmission 4 then will be found within a range of 11.3 to 0.69.

Furthermore, in the position "O" of the automatic transmission selection lever 26, because of an operational strategy, which strategy is superimposed on the respectively activated shifting program, at a particular operational point of the drive string, a change is automatically undertaken in the ratio of the range group 9 from the ratio stage "low" into the ratio stage "high". Simultaneously, in the automatic transmission, a shift is made from the ratio "A3" to the ratio "A1". The shifting procedures of the multi-group transmission 4 are carried out entirely by an appropriate control of the automatic transmission 8 and the range group 9, whereby the driver of a motorized vehicle is freed from this duty.

Continuing, the choice of the ratio "low" or "high" of the range group 9 is governed by the superimposed operational strategy in such a manner that inappropriate ratio combinations of the automatic transmission 8 and the range group 9 are prevented.

By "inappropriate" ratio combinations would be combinations of the individual ratios of the automatic transmission 8 and the range group 9, wherein very high input speeds of rotation of the range group 9 exist. This could be the case, if, in the range group 9, the ratio "low" is selected and in the automatic transmission 8 the ratio "A5" must be actuated in order to comply with a ratio of the multi-group transmission 4 demanded by the shifting program.

Since, by a combination of a "small" ratio of the automatic transmission 8 with the ratio "low" of the range group 9, a very high input speed of rotation can occur in the range group, which would impair the efficiency of the multi-group transmission 4 in order to obtain a respectively demanded ratio of the multi-group transmission 4, the ratio in the range group 9 is altered from "low" to "high" and in the automatic transmission, automatically a "larger" ratio for the establishment of the required ratio of the multi-group transmission 4 is shifted into. Under these circumstances, the input speed of rotation of the range group 9 is reduced and the range group 9 is operated in the "high" status, whereby the efficiency of the multi-group transmission 4 is clearly improved. This leads, in turn, to a reduced generation of heat in the range group 9 as well as to a reduction of fuel consumption of the motor 2 of the vehicle.

In order to carry out a shifting operation, i.e., a changing of the ratio of the range group 9, which would be accompanied with the least possible interruption of traction, the change is to be undertaken during a closely defined operating condition of the multi-group transmission 4 of the drive train 1.

FIG. 3 shows a bar diagram, whereby the height of each respective bar corresponds to respective quantitative value of the ratio of multi-group transmission 4. The ratio of the multi-group transmission 4 arises from, respectively, the combination of the ratio of the automatic transmission 8 and the ratio of the range group 9 and represents, again respectively, one of the different gear stages, namely "I", "II", "III-L", "III-H", "IV", "V", "VI", "VII" and "VII" of multi-group transmission 4.

In this matter, it is significant that the ratio of the gear stages "III-L" and "III-H" of the multi-group transmission 4 by means of an appropriate staging of the automatic transmission 8 and the range group 9 are, essentially, the same.

The two gear stages "III-L" and "III-H" of the multi-group transmission 4 are similar to all other gear stages of the multi-group transmission 4, because of a defined combination of the ratios of the automatic transmission 4 and the range group 9. In this case, the gear stage "III-L" is established in the multi-group transmission 4, then in the automatic transmission 8, the ratio "A3" is set, further, simultaneously in the range group 9 the ratio "low" is shifted into. Different thereto, in a case wherein the gear stage "III-H" of the multi-group transmission 4 is actuated, then in the automatic transmission 8 "A1" is selected and in the range group 9 the ratio "high" is shifted into.

In the chosen position "O" of the automatic transmission selection lever 26, upon the presence of a certain operational condition, shifting is made in the range group 9 from "low" to "high" or in the opposite direction. This operational condition is characterized, as an example, in FIG. 4 by a circuit 30.

Figure 4:
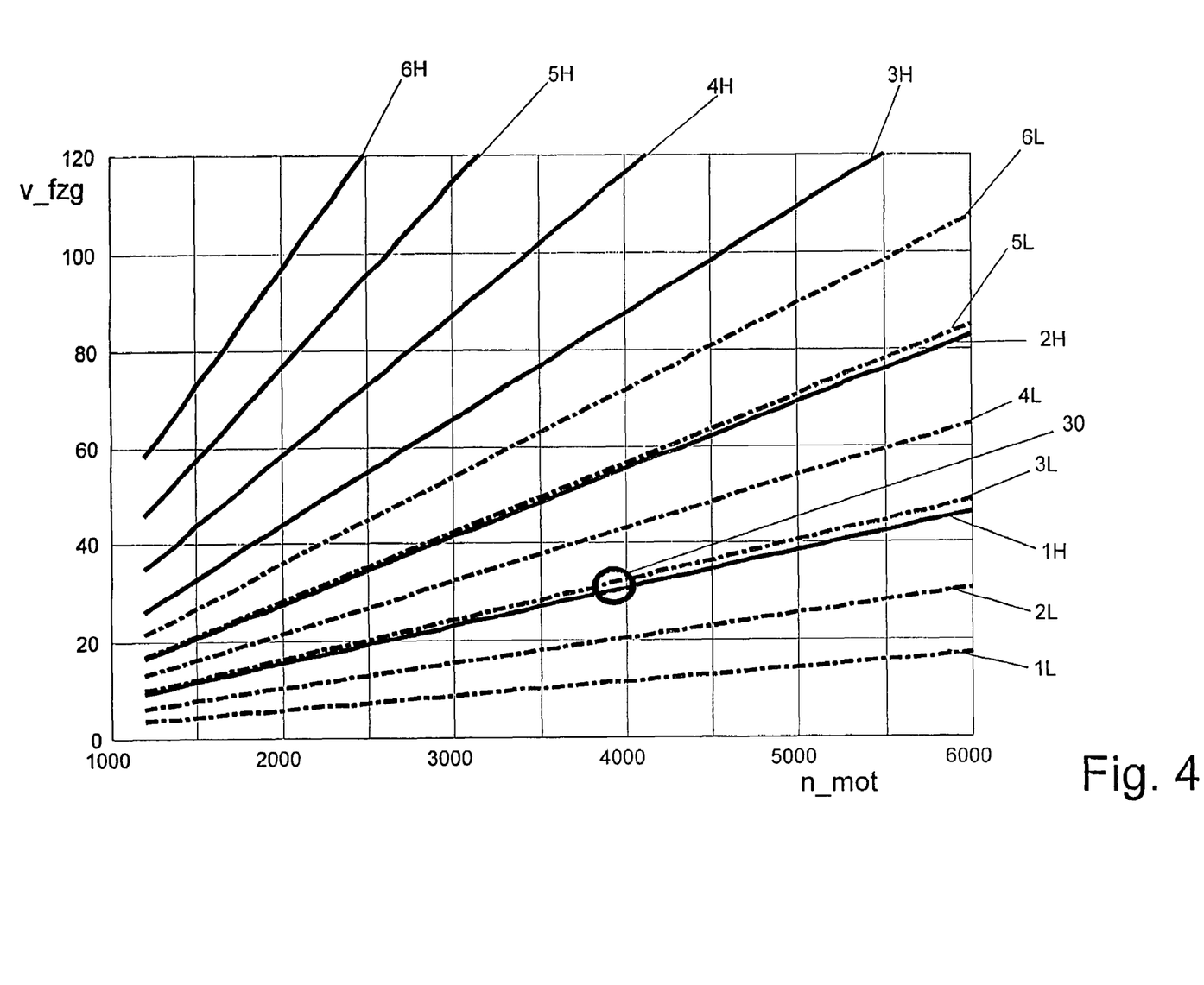
FIG. 4 a diagram, wherein for individual gear stages of a multi-group transmission in accord with FIG. 3, is respectively shown a curve of the velocity of a vehicle in relation to the motor speed of rotation.

Because of the fact that the ratio of the multi-group transmission 4 in the gear stages "III-L" and "III-H" are essentially equal, consequently, the curves of the same, wherein respectively vehicle speed $v_{fzg}$, is plotted in FIG. 4 as ordinate and speed of rotation $n_{mot}$ of the motor 2 as abscissa, are practically identical. More closely defined, a speed of rotation $n_{mot}$ of the motor 2 of the gear stage "III-L" corresponds at a certain vehicle travel velocity $v_{fzg}$ approximately to the speed of rotation $n_{mot}$ of the motor 2 of the gear stage "III-H", the reverse being, of course, also true.

In this condition of the operation of the drive train 1, if the ratio in the range group 9 changes from "low" to "high", then the actual change of ratio can be executed in a very short time of interruption of the traction, since the speed of rotation $n_{mot}$ of the motor 2 during the change of the ratio in the range group 9 remains practically the same and only internal rotational inertias of the multi-group transmission 4 need be mutually synchronized.

FIG. 4 might be entitled a "Rotary Speed vs Vehicle Speed Diagram" wherein the presented practically straight line curves respectively show the vehicle speed $v_{fvg}$ against the speed of rotation $n_{mot}$ of the motor 2 at the various ratios of the multi-group transmission 4. The ratios of the multi-group transmission 4 are derived from the combination of the ratio of the automatic transmission 8 and the ratio of the range group 9 which generates two ratio stages.

The individual curves are respectively designated by the letters "A" and one of the numbers "1" to "6", which are given together in the ratios set in the automatic transmission 8. Moreover, following the number, is to be found the letter, namely "H" or "L", whereby the letter "L" represents the ratio "low" and the letter "H" stands for the ratio "high" of the range group 9.

In this way, the designation "A2H", makes it obvious that the designated curve of the vehicle speed $v_{fzg}$ is set at a ratio of the multi-group transmission 4, which corresponds to the combination of the second ratio "A2" of the automatic transmission 8, and the ratio "high" of the range group 9 and the ratio gear stage "IV" of the multi-group transmission 4.

From the "Rotary Speed vs Vehicle Speed Diagram" of FIG. 4 can be inferred that the curves of the vehicle travel speed $v_{fzg}$ against the rotational speed $n_{mot}$ of the motor 2 are nearly identical when, in the automatic transmission, the ratio "A3" is set and simultaneously in the range group the ratio stage "low" is shifted into or if, in the automatic transmission 8, the ratio "A1" is shifted into and in the range group 9, simultaneously, the ratio "high" is set.

With this information, it becomes clear that in connection with the presentation in FIG. 3, that the change of the ratio stage in the range group from "low" to "high" or from "high" to "low" is particularly of advantage, if in the automatic transmission the ratio of "A3" is shifted into the ratio "A1" (or vice versa) simultaneously. The ratio of the multi-group transmission 4 remains, in such a case, essentially the same, on which account a combining speed of rotation of the motor 2 compared to the desired speed of rotation of the multi-group transmission 4, with which the range group 9 is synchronized, essentially, is the same as the speed of rotation of the motor 2 compared to the ratio which is actuated in the multi-group transmission 4.

This means that upon a shifting of the ratio of the range group 9, a matching of the speed of rotation of the motor 2 is held up and a synchronization of the closable shifting element of the range group 9 as well as the closable shifting element of the automatic transmission 8 which, likewise, is carried out independently of the speed of rotation of the motor 2. This can be done in a very short time, namely, from 0.1 to 0.2 seconds or better to 0.15 seconds.

This provides a substantial shortening of the interruption time of loss of traction, especially when compared to conventional shifting strategies common in current practice. The conventional shifting can have a duration of principally half a second up to one second, which is a substantial interruption of traction.

The curves "A5L" and "A2H" of the "Rotary Speed vs Vehicle Speed Diagram" of FIG. 4 likewise show that they are nearly identical. The ratio combination from the ratio "A5" of the automatic transmission 8 and the ratio "low" of the range group 9 for the formation of the ratio of the multi-group transmission 4, however, would not be selected, because of the negative effects brought about by the superimposed operational strategy, which was input into the control system and into the respectively actuated shifting program.

Obviously, it lies within the judgment of the expert to specially execute a change in the ratio in the range group 9 to meet requirements of an existing application so that the change between the ratio stage "low" and the ratio stage "high" of the range group 9, when the automatic transmission 8, the ratio "A5" or the ratio "A2" has already been engaged and, corresponding to the ratio change in the range group 9 in the automatic transmission 8, a reverse shifting has taken place from the ratio "A2" toward the ratio "A5" (or, vice versa).

Figure 5:
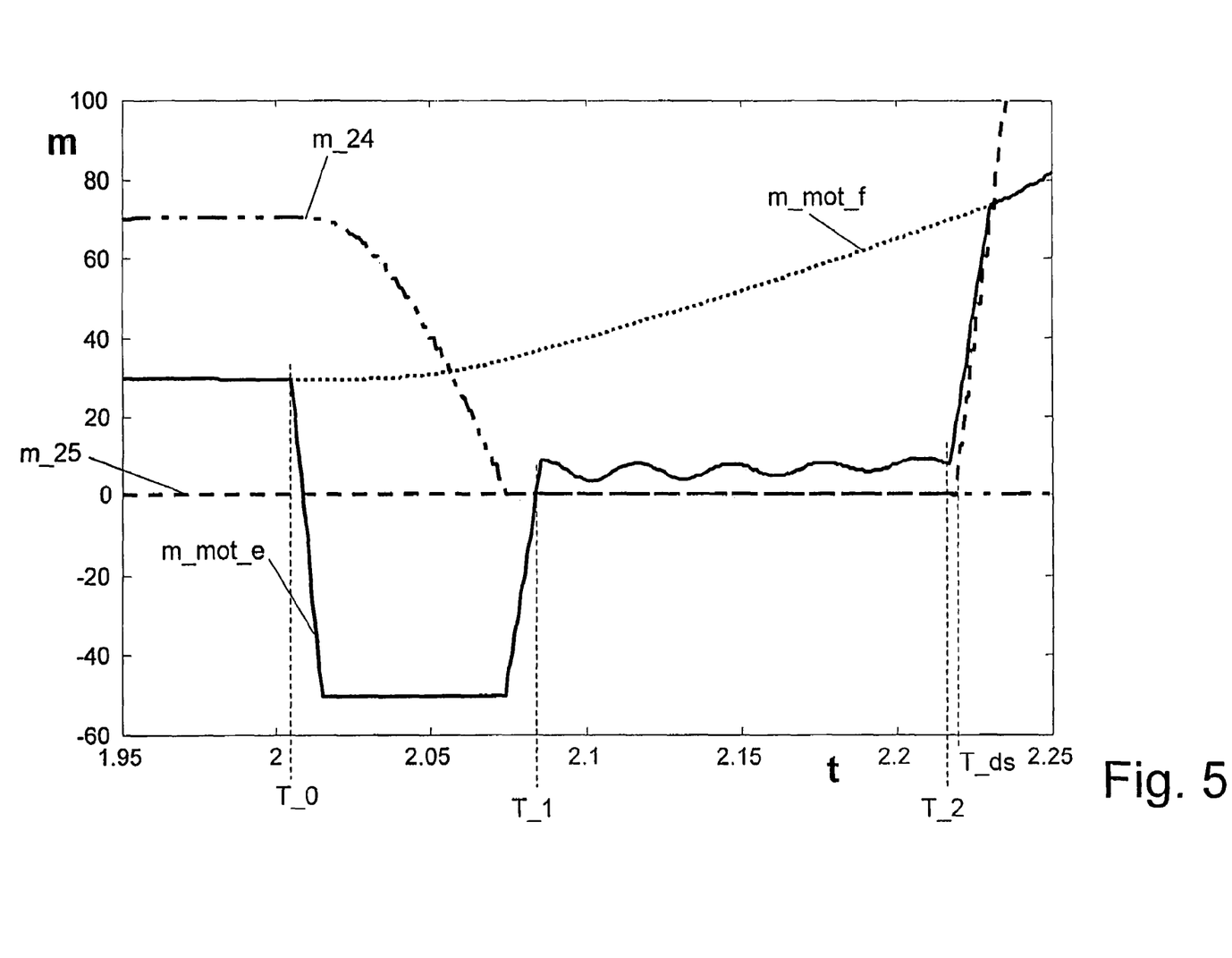
FIG. 5 several curves of torque vs time, which occur during a change of a ratio in the range group of the multi-group transmission in relation to components of the drive train as shown in FIG. 1.

In FIG. 5 is presented a plurality of torque curves within a shifting time t during a change of the ratio of the range group 9 from "low" to "high". In this diagram, a curve $m_{24}$ represents the curve of the torque applied to the first shifting element 24 of the range group 9, which occurs during the shifting in the range group 9. A curve $m_{25}$ shows the torque applied to the second shifting element 25 of the range group during the change of the ratio of the range group 9 from the ratio stage "low" to the ratio stage "high".

Corresponding thereto is a curve $m_{mot-e}$ of the motor 2, which sends a signal to the control apparatus and is designated as a so-called e-gas-moment.

The e-gas-moment $m_{mot-e}$ is that driving moment of the motor which, during the shifting, is applied to the multigroup transmission 4 on its motor-side and which is actuated by the control apparatus. Additionally, a curve $m_{mot-f}$ is shown, which depicts the curve of a drive moment of the motor 2 instigated by the driver and which, during the ratio change in the range group 9, however, was not given consideration.

If, because of a superimposed operational strategy input into the control apparatus a signal is given, to the end that, for the relief of the drive train in the range group 9, a shifting should be made therein from the ratio stage "low" into the ratio stage "high", then the drive moment of the motor 2 in accord with the curve $m_{mot-e}$ of the e-gas-moment for the relief of the drive train 1 should be retained until the first dog clutch shifting element 24, corresponding to the curve $m_{24}$, is completely relieved of load.

Subsequently, the e-gas-moment $m_{mot-e}$, which is held constant until the complete relief of the first shifting element 24 is changed in the direction of a positive value. After this, then the e-gas-moment $m_{mot-e}$ is, to a certain extent, controlled up to the final through-shift of the second element, which is, likewise, designed as a dog clutch 25 in the range group 9. By this action, a synchronization of the second shifting element 25 is made possible.

From a defined point of time $T_{ds}$, i.e., the elapsed time of shifting of the second shifting element 25, the torque increases, as shown by the curve $m_{25}$, which rises the torque of the second shifting element 25 practically vertical, whereby the flow of power between the motor 2 and the output shaft of the motor vehicle is restored. Simultaneously, a match is made between the e-gas-moment $m_{mot-e}$ and the driver moment $m_{mot-f}$, whereby the procedure of the shifting, i.e., the change of the ratio in the range group 9, is completed.

Figure 6:
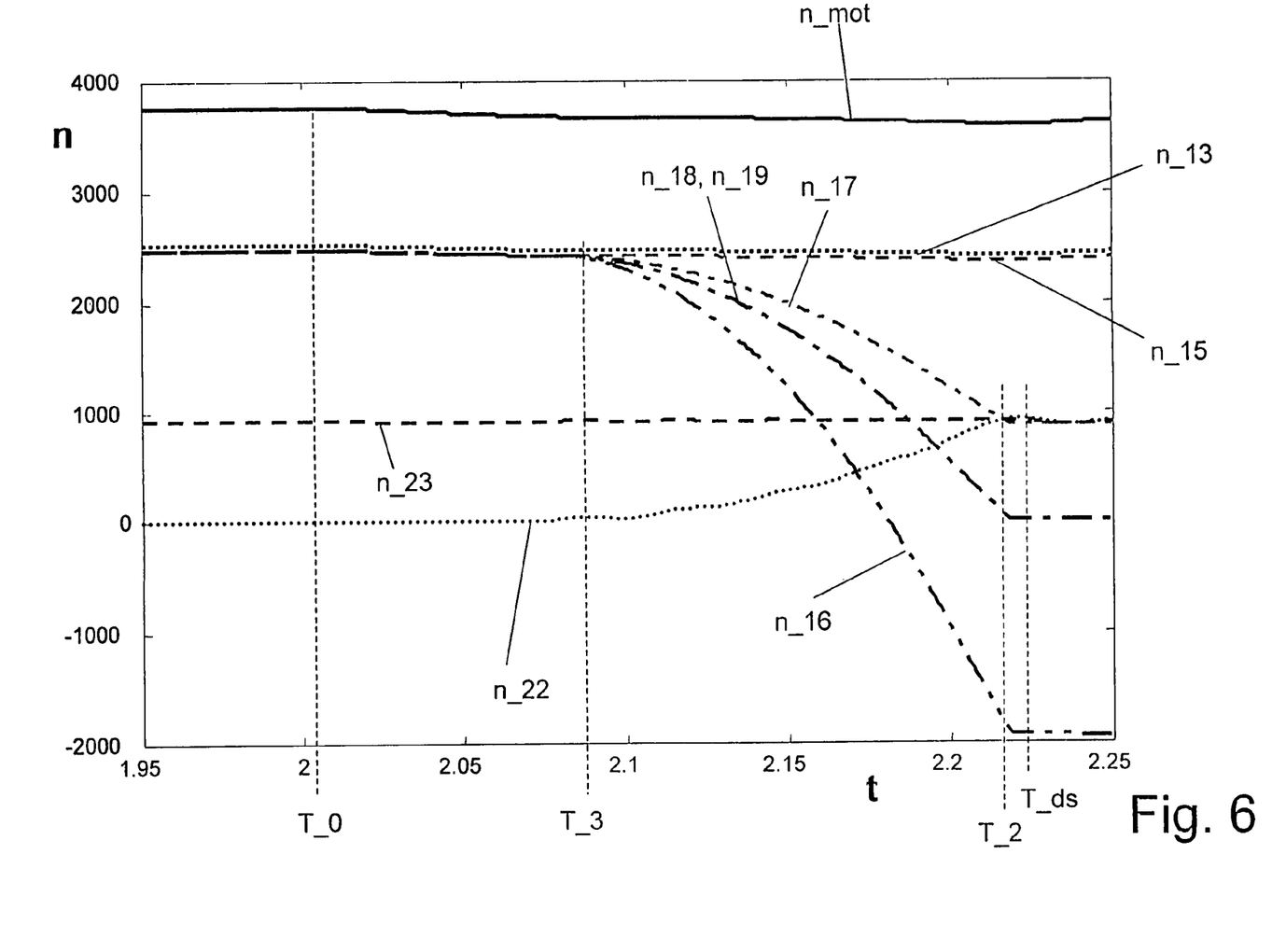
FIG. 6 a chart showing speed of rotation vs time curves, which correspond to the torque vs time curves appearing in FIG. 5.

The diagram of FIG. 6 shows a plurality of speed of rotation curves of different components of the drive train 1, in accord with FIG. 1, in their state during shiftings in the range group 9 and in the automatic transmission 8, exhibiting the synchronizing of the range group 9 by way of the automatic transmission 8, i.e., the synchronization of the shifting elements thereof, namely A to E. In these curves, the speed of rotation n is plotted as ordinate over shifting time t as abscissa.

The various curves of speed of rotation of the individual components of the drive train 1 are respectively designated by the letters n and the reference numbers of the components of the said drive train 1 are as shown in FIG. 1. Thus, for example, the curve $n_3$ presents the curve of speed of rotation of the planetary carrier 13 of the first planetary gear set 10.

At the instant $T_0$, at which the shifting phase for the change of the ratio of the range group 9 begins, the e-gas-moment $m_{mot-e}$ is changed, as may be seen in the curve presented in FIG. 5. This measure, which was introduced by the control apparatus has, at first, no effect on the rotational speed curves of FIG. 6, namely curves $n_{13}$, $n_{15}$, $n_{16}$, $n_{16}$, $n_{18}$, $n_{19}$, $n_{22}$, $n_{23}$ and the curve of the motor 2 drive $n_{mot}$. With increasing shifting time t, the torque $m_{24}$ of the first shifting element 24 of the range group 9 is reduced to zero and the first shifting element 24 of the range group 9 is opened.

This means that the internal gear 22 of the range group 9 is released from its fixation on the transmission housing 20A of the range group 9 and now becomes capable of rotation. From this point of time, the rotational speed $n_{22}$ of the internal gear 22 of the range group 9 increases gradually in the direction of the rotational speed $n_{23}$ of the planetary carrier 23 of the range group 9.

From a point in time $T_3$, transfer capabilities for closing or opening, which belong to the automatic transmission 8, are so established that reductions were made in the speed of rotation $n_{16}$ of the second sun gear 16 of the second planetary gear set 14; the speed of rotation $n_{17}$ of the common internal gear 17 of the second planetary gear set 14; the speed of rotation $n_{18}$ of the first planetary carrier 18 of the second planetary gear set 14, and the speed of rotation $n_{19}$ of the second planetary carrier 19 of the second planetary gear set 14. The speed of rotation $n_{13}$ of the planetary carrier 13 of the first planetary gear set 10; the speed of rotation $n_{15}$ of the first sun gear 15 of the second planetary gear set 14, and the driving speed of rotation $n_{mot}$ of the motor 2 remain essentially practically unchanged.

The establishment of the capability of transfer of the shifting elements of the automatic transmission 8 allows, a matching of the speed of rotation $n_{22}$ of the internal gear 22 of the range group 9 to the speed of rotation $n_{23}$ in combination with the signaling of the e-gas-moment $m_{mot-e}$, until the speeds of rotation $n_{22}$ and $n_{23}$ are identical. At this moment, the second shifting element 25 of the range group 9 is synchronized and can be released or closed. This instant of time is more exactly characterized in FIG. 6 by the term $T_2$.

At the point in time marked by $T_{dS}$, a position sensor detects the release of the second shifting element 25 of the range group 9 and the e-gas-moment $m_{mot-e}$ is compared to the driver moment $m_{mot-f}$.

FIGS. 7 to 11 represent, essentially represent the presentations of FIGS. 2 to 6. With the aid of FIGS. 7 to 11 in the following, the behavior of individual operational parameters of the drive train 1, as seen in FIG. 1, during the change of the ratios of the automatic transmission 8 and the range group 9, is described, whereby a control of the drive train 1 corresponding to one embodiment of the invented procedure is made, which is alternative to the procedure as is carried out in relation to FIGS. 2 to 6. For the sake of clarity in the description covering FIGS. 7 to 11, the same reference numbers are used for construction and functionally alike components as were so used in the description covering FIGS. 1 to FIG. 6.

Figure 7:
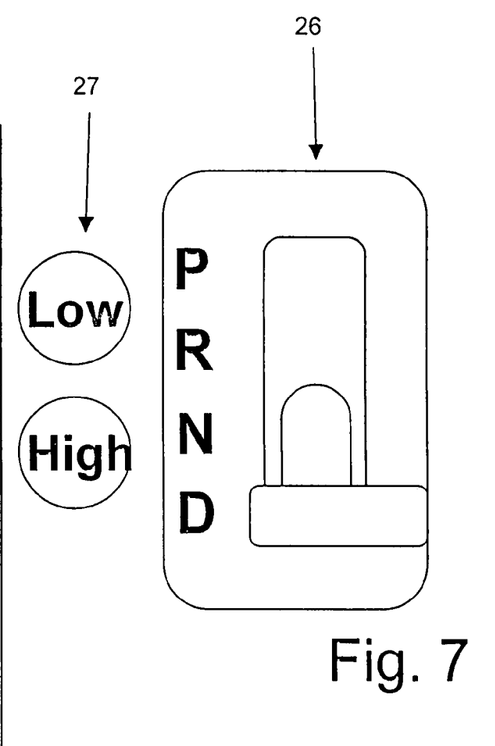
FIG. 7 an additional embodiment example of an automatic transmission selection lever, which is combined with a shift selector for the demand of a ratio of the range group.

FIG. 7 shows an automatic transmission selection lever 26 with the lever positions marked "D", "N", "R" and "P". With the automatic transmission selection lever 26 is also a shift-selector 27 with combined choices of either "low" or "high", by driver-side key-selection from the range group 9. The shift-selector 27 is so connected with the control apparatus of the drive train 1 that in a driver selection of the shift-selector 27, the respectively demanded ratio stage "low" or "high" shifts into the range group 9.

Figure 8:
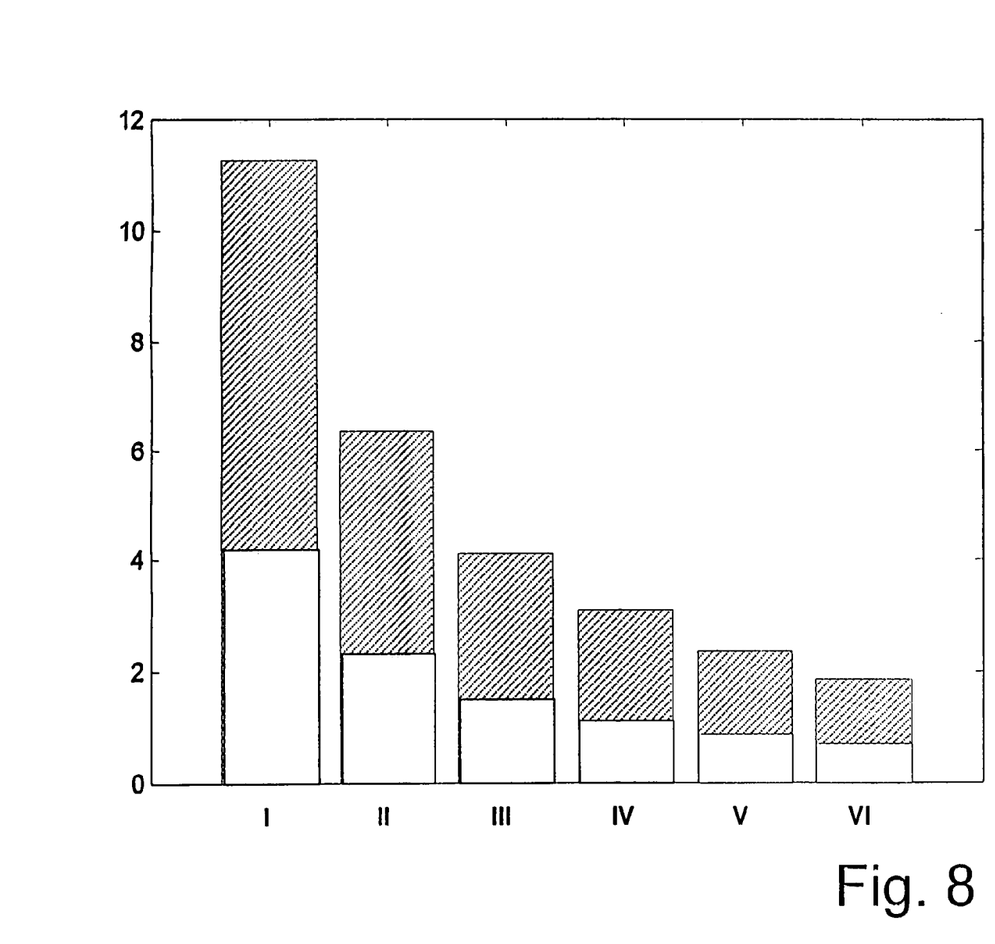
FIG. 8 a bar chart in which different gear stages of a multi-group transmission are presented; the said stages are controlled by the automatic transmission selection lever and the selection means in accord with FIG. 7.

Dependent upon the respective ratio established in the range group 9, the individual gear stages "I", "II", "Ill", "IV", "V" and "VI" of the multigroup transmission 4 possess those ratios which are set forth in a bar diagram in FIG. 8. The total height of one bar represents respectively a ratio of the individual gear stages "I", "II", "III", "IV", "V" and "VI" of the multigroup transmission 4, if the selection "low" has been activated for the range group 9. The individual gear stages "I", "II", "III", "IV", "V" and "VI" of the multigroup transmission 4 are respectively actuated by a corresponding change of the ratios of the automatic transmission, whereby the respective ratio of the gear stages "I", "II", "III", "IV", "V" and "VI" of the multigroup transmission 4 depends upon the ratio actuated in the range group 9.

In the range group 9, if the ratio stage "low" is in use, then those ratios are made available for the individual gear stage "I", "II", "Ill", "IV", "V" and "VI" of the multi-group transmission 4 which are indicated by the cross hatched bars of FIG. 8. This means that the multi-group transmission 4 in the ratio stage "low" of the range group 9 possesses six gears; the ratio values of which run between, for example, 11.3 and 1.87. In the range group 9, if the ratio "high" has been selected, then the multi-group transmission 4, likewise, exhibits six gears; the ratio values of which lie between 4.17 and 0.69, for example.

Figure 9:
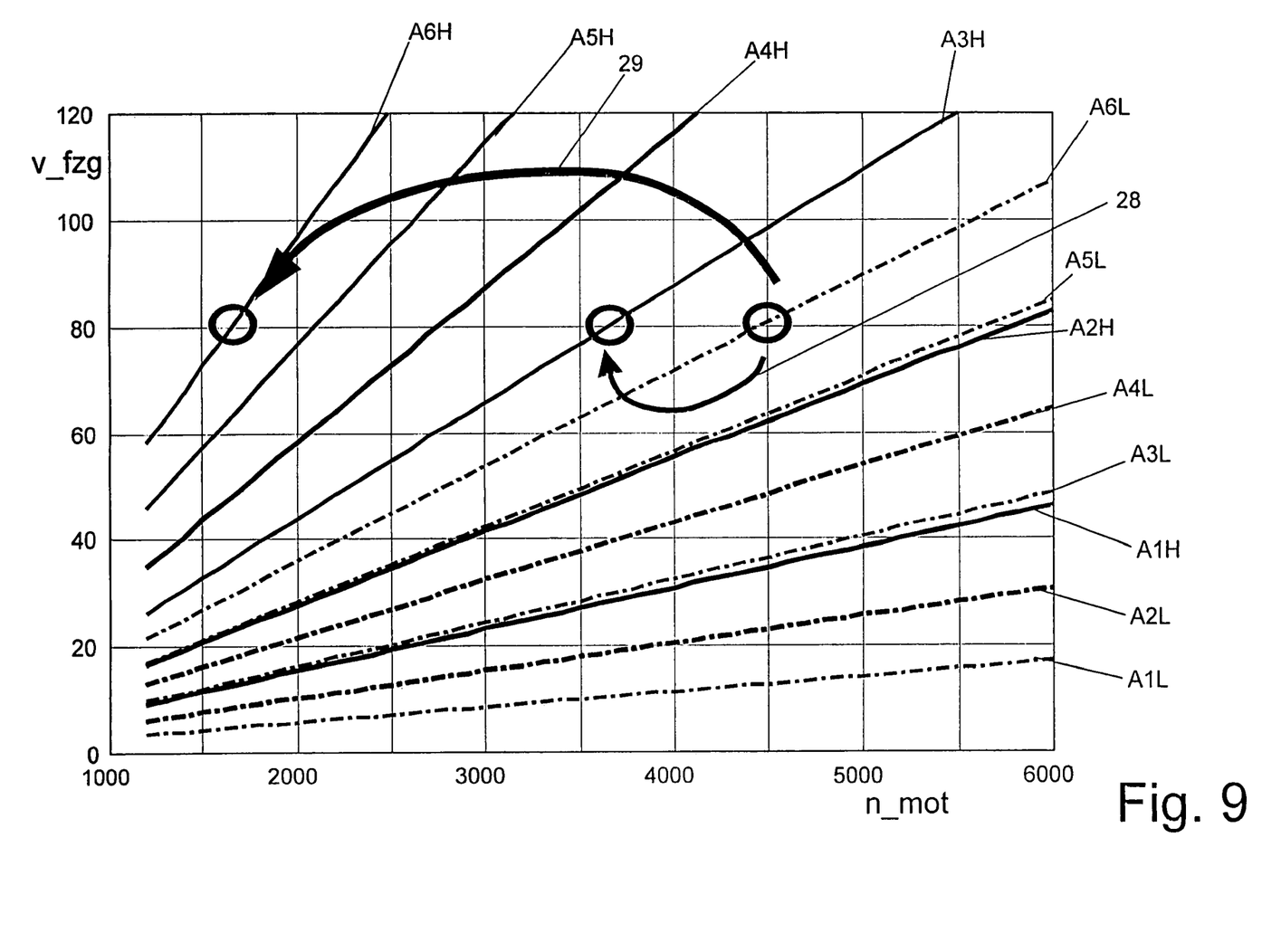
FIG. 9 a diagram in which for each individual gear stages of a multi-group transmission in accord with FIG. 8, a curve is presented of a vehicle velocity vs a speed of rotation of the motor.

FIG. 9 shows a speed of rotation vs vehicle speed graph which, in principal corresponds to the diagram shown in FIG. 4. Further, in FIG. 10, several torque vs time curves are shown to which curves various components of the drive train 1 can be subjected during a change of the ratio in the range group 9 from the ratio stage "low" to the ratio stage "high". Additionally, in the FIG. 11, a plurality of rotational curves of individual components of the drive train 1 are shown in accord with FIG. 1, during the ratio change in the range group 9 plotted against the shifting time t.

With the aid of the diagrams presented in FIGS. 9 to 11, in the following a procedure for the control of the drive train 1 is described wherein a change of the ratio of the range group 9 from the ratio stage "low" to the ratio stage "high", due to optional vehicle speed, can be carried out with very short traction loss interruptions.

As can be seen din FIG. 9, at a particular point in time, namely in this case at time point $T_0$, the driver of the vehicle chooses the ratio stage (high) in the range group 9 on the shift-selector 27, wherein the ratio stage "low" has been in use up to this time. If the driver should have chosen the ratio stage "low", if this has already been closed in the range group 9, then the driver's desired demand would be ignored in the control apparatus of the drive train 1.

Figure 10:
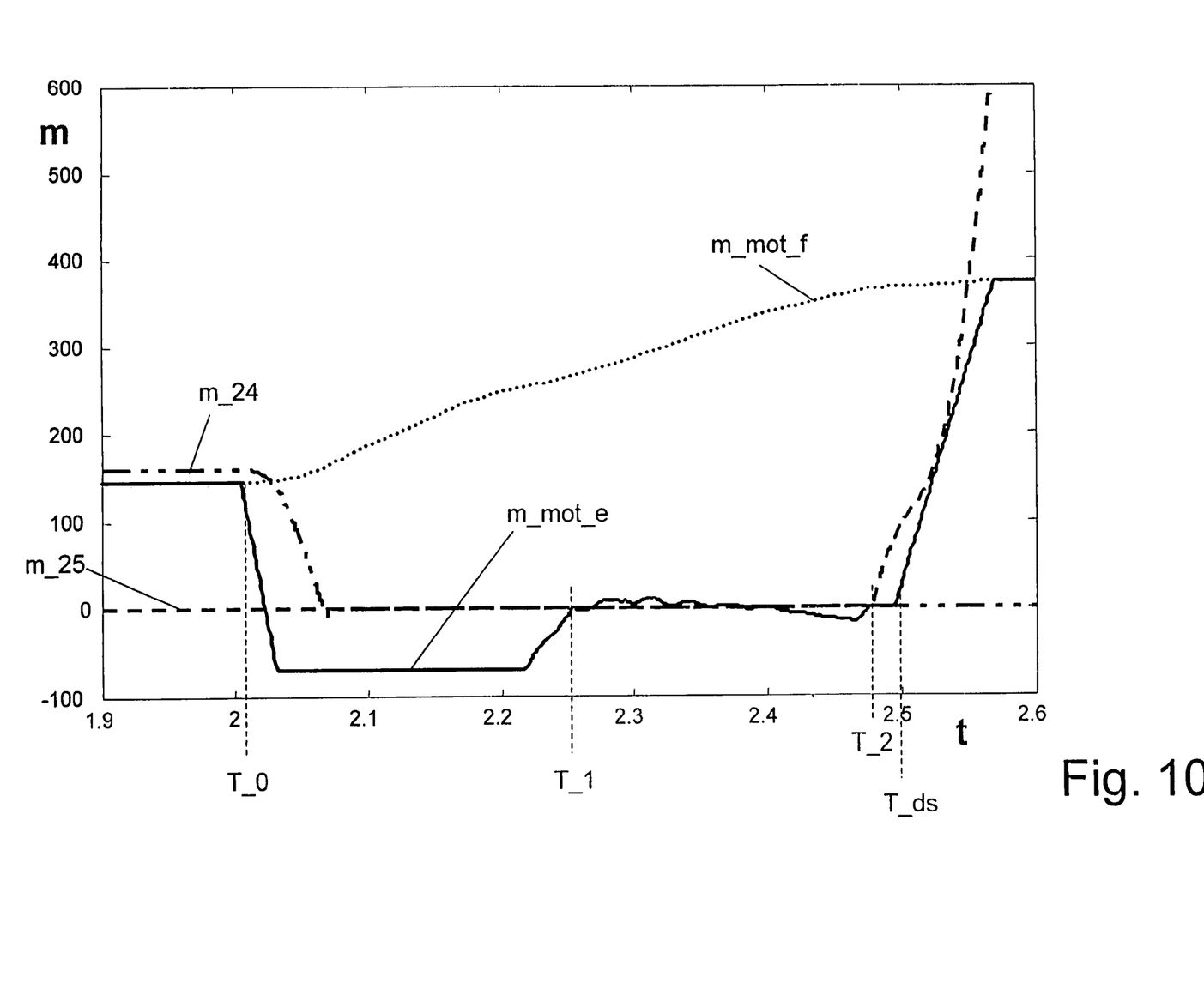
FIG. 10 several curves of torque vs time, which occur during a change of a ratio as shown in FIG. 9, in the range group of the multi-group transmission affecting components of the drive train in accord with FIG. 1.

Upon the input of the driver's demand into the control apparatus of the drive train 1, the control apparatus reduces the drive moment of the motor 2, which is reflected in the curve of the e-gas-moment $m_{mot-e}$ as seen graphically in FIG. 10.

By way of the reduction of the drive moment of the motor 2, the drive train 1 is relieved of load whereby, simultaneously, the torque $m_{24}$, with which the first shifting element 24 of the range group 9 is subjected, drops to zero. If the first shifting element 24 is full relieved of load, then the first shifting element 24 is released, by way of which, the neutral condition is established in the range group 9. The first shifting element 24, which is constructed as a dog clutch, is made to open, via an electric motor in the range group 9. Via a position sensor, which is not further described here, the open condition of the first shifting element 24 is determined. A signal of the positioning sensor is processed by the control apparatus and shifting elements of the automatic transmission 8, which are to be closed and, which elements co-act in the automatic transmission in counter shifting which corresponds to shifting in the range group, and the elements are directed by the control apparatus.

The advantages of the method whereby, with a change of the ratio of the range group 9, a corresponding counter shifting takes place in the automatic transmission 8 and does this without a change in the velocity $v_{fzg}$ of the vehicle, are clarified in FIG. 8 by arrows 28, 29. At a change of the ratio of the range group 9 from "low" to "high", if when the automatic transmission 8 is in the shifting mode "A6", a counter shift in the automatic transmission 8 into the ratio "A3" occurs then a merging speed of rotation of the motor 2 of the new gear of the multi-group transmission 4 deviates considerably less from the speed of rotation $n_{mot}$ of the motor 2 at the ratio "A6L" of the multi-group transmission 4, than would be the case if this were done without counter shifting in the automatic transmission 8.

The merging speed of rotation $n_{mot}$ the motor 2, which would be shifted into without a corresponding counter shift in the automatic transmission 8, is indicated by the additional arrow 29 in FIG. 8. This large cross-over of speed of rotation is disadvantageous for the comfort of driving, since a compensating time, while the speed of rotation of the motor 2 to the new speed, that is to say, a connecting speed of rotation is achieved, is much longer than is the case with lesser speed of rotation differences. The disadvantage arises from the fact, that the drive train, during the compensation time, is relieved of duty and the shifting causes a break in the delivery of tractive force, which, under certain circumstances causes a continuation of existing travel upward on a steep incline to be impossible.

After the removal of load from the drive train 1 and correspondingly, also from the first shifting element 24 of the range group 9, the torque of the motor 2, i.e., e-gas-moment $m_{mot-e}$, is held constant and in a subsequent control phase, is adjusted in such a manner as shown in FIG. 10 that, in accord with the torque $m_{mot}$ of the motor 2 as well as with the speed of rotation of the same, namely $n_{mot}$, a synchronization is made of the second shifting element 25 of the range group 9. This allows a new ratio to be set in the closable shifting element of the automatic transmission 8.

Figure 11:
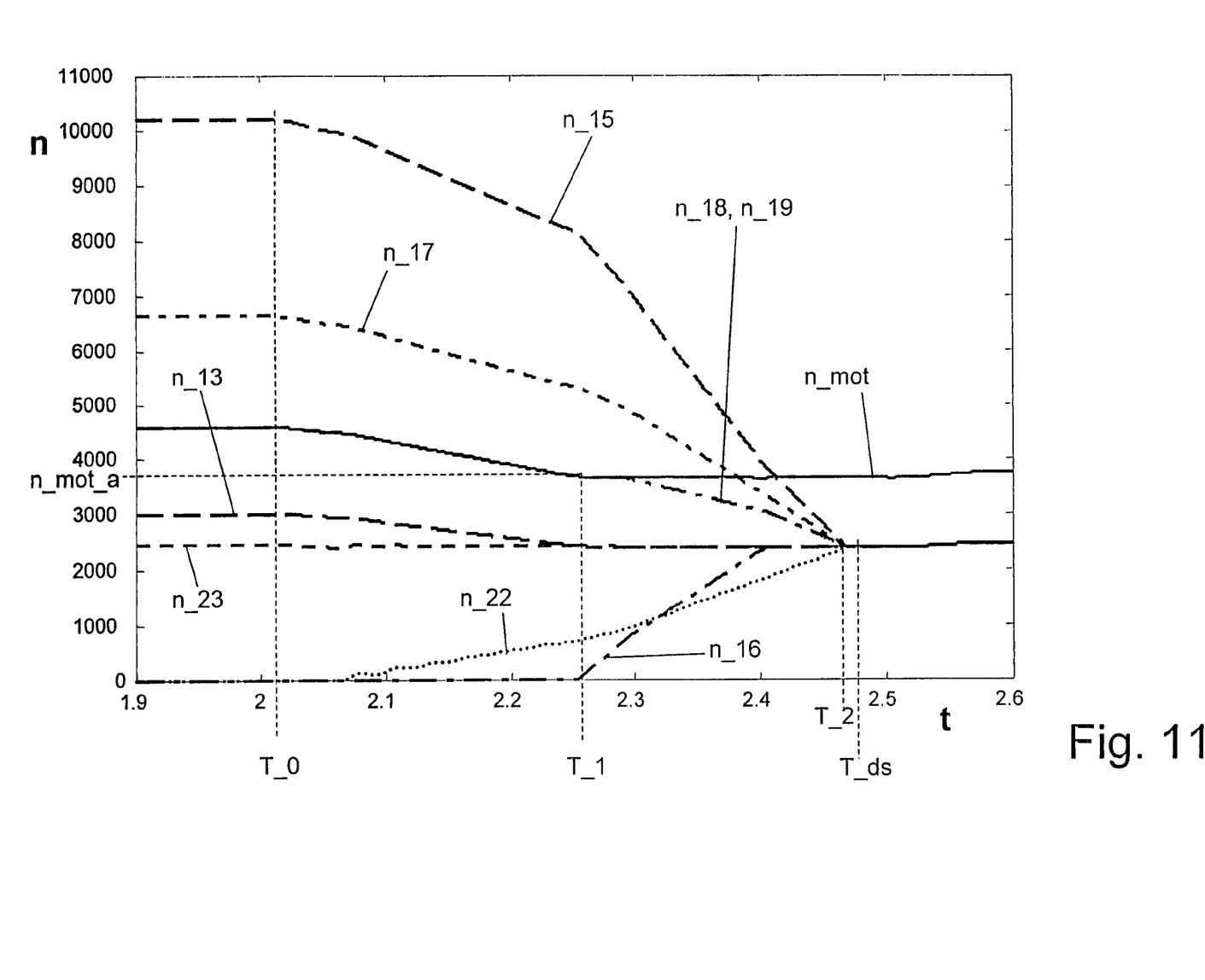
FIG. 11 several curves of rotational speed vs time of components of the multi-group transmission, which correspond to the curves of torque vs time of FIG. 10.

Torque curves (vs time) are shown in FIG. 10, corresponding to the speed of rotation curves (vs time) for the individual components of the drive train 1 are shown in FIG. 11. At a point of time $T_0$, at which a driver's demand for a change in a ratio in the range group 9 is made, namely a change from the ratio "low" to the ratio "high", which the driver actuates by the shift-selector 27, in accord with the said demand, the shifting begins in the multi-group transmission 4 which calls for a change of the speed of rotation, i.e., a change of the curves of the individual speeds of rotation of those elements which are to co-act in the shifting of the drive train 1.

In order to bring about a change from the motor 2 speed of rotation $n_{mot}$ in the least possible time from the speed of rotation of the gears at the instant $T_0$ for the multi-group transmission 4, as originally set by the driver, to the synchronized connective speed of rotation of the gear of the multi-group transmission 4 now selected, a capability of transfer of the engaged and disengaged shifting elements of the automatic transmission 8 is enacted in such a manner that the motor 2 assumes the speed of rotation $n_{mot}$, as is seen in the curve presented in FIG. 11.

At the point in time $T_1$, the speed of rotation $n_{mot}$ of the motor 2 attains the connective rotational speed $n_{mot-a}$, which previously was computed in the control apparatus in accord with the "new" ratio of the multi-group transmission 4 and the actual vehicle travel speed, namely $v_{fzg}$. By means of this, the vehicle travel speed $v_{fzg}$, is determined via ABS sensors (not further described) available in the vehicle or by other appropriate apparatuses contained in the vehicle.

The motor 2 speed of rotation $n_{mot}$ can be brought essentially more quickly to the connection rotational speed $n_{mot-a}$ with the preselected procedure than this can be accomplished with a sole adjustment of the e-gas-moment. In this way in the present case, the motor 2 is advantageously braked by an increase of the transfer capability of the closable shifting elements of the automatic transmission 8. The closable shifting elements of the automatic transmission 8 are operating in a so-called "slip-phase" and brake the motor 2 at the corresponding connection speed of rotation of the motor 2 in the shortest possible time. The control of the shifting elements of the automatic transmission, which are to be shifted, is carried out in such a manner that by a controlled mutual frictional contacting of the shifting elements, a transfer capability of the required value is made available.

At the instant $T_2$, the closable shifting elements of the automatic transmission 8 and the second shifting element 25 of the range group 9 are synchronous, so that the closable shifting elements of the automatic transmission 8, as well as the second shifting element 25, can be closed, and the flow of force from the motor 2 to the output of the vehicle is reestablished. At the same time, the automatic transmission openable shifting elements are, indeed, opened and thus taken out of the flow of force of the drive train 1.

By means of an additional position sensor, the through shifting of the second shifting element 25, which is constructed as a dog clutch, is recognized and the drive moment of the motor 2, i.e., the e-gas-moment $m_{mot-e}$, is matched to the demanded drive moment $m_{mot-f}$ so that travel continues on with corresponding drive speed of rotation and torque of the motor 2.

The above described synchronization of the shifting elements of the automatic transmission 8 and the range group 9, which take part in the shifting of the multi-group transmission 4, form the basis of the speed of rotation curves shown in FIG. 11, namely $n_{13}$, $n_{15}$, $n_{16}$, $n_{17}$, $n_{18}$, $n_{19}$, $n_{22}$, and $n_{23}$. The point of time $T_0$ marks the beginning of the shifting phase in the multi-group transmission 4. In this application, contrary to the description accompanying FIG. 6, the shifting is not an automated shifting, but is executed in accord with a demand at the driver's option. With the generation of the driver's optional demand for the shifting into the ratio "low" in the range group 9, a capability of transfer of the shifting element of the automatic transmission 8 is so adjusted that the speeds of rotation $n_{13}$, $n_{15}$, $n_{18}$, $n_{19}$, and the motor speed of rotation $n_{mot}$ are all reduced. The speed of rotation $n_{23}$ of the planetary gear carrier 23 of the range group 9 remains essentially unchanged in this operation.

The reduction shown in FIG. 10 of the motor torque $n_{mot}$ by the reduction of the e-gas-moment $m_{mot-e}$ leads to a load relief of the first shifting element 24 of the range group 9, so that this can be opened quickly after the point in time $T_0$, and the speed of rotation $n_{22}$ of the internal gear 22 of the range group 9 becomes greater with slowly increasing shifting time t while approaching the speed of rotation $n_{23}$ of the planetary gear carrier 23 of the range group 9.

From the point in time designated as $T_1$ at which point the speed of rotation $n_{mot}$ of the motor 2 has already reached the connectingly matched speed of rotation $n_{mot-a}$ the transfer capability of the shifting element of the automatic transmission 8 is so adjusted that the speeds of rotation $n_{15}$, $n_{17}$, $n_{18}$, $n_{19}$ are further reduced and the speed of rotation $n_{16}$ of the second sun gear 16 of the second planetary gear set 14 increases to approach the speed of rotation $n_{23}$ of the planetary carrier 23 of the range group 9.

At this point in time $T_2$, the speeds of rotation $n_{15}$, $n_{17}$, $n_{18}$, $n_{19}$ and $n_{22}$ are equal to the speeds of rotation $n_{13}$ and $n_{23}$, so that the closable shifting elements of the automatic transmission 8 as well as the second shifting element 25 of the range group 9 are synchronized and can be closed. At the point in time $T_{ds}$, the through shifting of the second shifting element 25 of the range group 9 is determined by a position sensor and the procedure of the shifting of the multi-group transmission 4 is concluded.

The two above described embodiment examples indicate the advantageous situation that mechanical synchronization in the range group 9 can be eliminated, whereby a reduction of traction-moment and an accompanying reduction of fuel consumption would take place. Additionally, a result of the no longer necessary mechanical synchronization, savings in weight, engine space, and cost advantages become available with the invented dog-clutch equipped range group.

Moreover, with the invented method, considerable shortening of the elapsed time of interruptions in traction can be gained during the changes of the ratios in the range group 9 as compared to such time-saving with conventional methods. In the embodiment example as shown in the FIGS. 2 to 5, the change of the ratio in the range group is automatic and the driver is thus relieved of this duty.

With the carrying out of the invented method in accord with the FIGS. 6 to 10, a change of the ratio in the range group with the generation of an optional demand by the driver for the changing of the ratio in the range group at any travel speed of the vehicle can be executed with minimal traction interruption time, whereby simultaneously, in accord with the gear change in the multi-group transmission, a matching motor rotational speed to the new ratio of the multi-group transmission is possible, whereby driving comfort and safety, especially upon steep inclines, are substantially improved.

REFERENCE NUMERALS

1 Drive train
2 Driving machine, i.e. "motor"
3 Start-up element
4 Multi-group transmission
5 Output drive shaft
6 Hydrodynamic torque converter
7 Controlled converter coupling
8 Automatic transmission
9 Range group
10 First planetary gear set
11 Internal gear of the first planetary gear set
12 Sun gear of the first planetary gear set
13 Planetary gear carrier of the first planetary gear set
14 Second planetary gear set
15 First sun gear of the second planetary gear set
16 Second sun gear of the second planetary gear set
17 Common internal gear of the second planetary gear set
18 First planetary gear carrier of the second planetary gear set
19 Second planetary gear carrier of the second planetary gear set
20 Transmission housing
20A Transmission housing of the range group
21 Sun gear of the range group
22 Internal gear of the range group
23 Planetary gear carrier of the range group
24 First shifting element of the range group
25 Second shifting element of the range group
26 Selection lever for the automatic transmission
27 Shift-selector
28 Arrow
29 Arrow
30 Circuit
A-E Shifting elements of the automatic transmission
"D" Drive, forward direction "A1"-"A6" Ratio of the automatic transmission
H Ratio "high" of the range group
L Ratio "low" of the range group
m Moment
$m_{mot-e}$ e-gas-moment
$m_{mot-f}$ Driver moment
$m_{24}$ Curve of the torque of the first shifting element of the range group
$m_{25}$ Curve of the torque of the second shifting element of the range group
n Speed of rotation
"N" Neutral
$n_{mot}$ Torque of the motor
$n_{mot-a}$ Connecting speed of rotation (matched speed of rotations)
"O" Off road, forward travel
"P" Parking
"R" Reverse
"t" Shifting time
"T" A point in time, a particular instant
$T_{dS}$ Point of through-shifting
$v_{fvg}$ Vehicle travel speed
I-III Ratio of the multi-group transmission
III-L Ratio of the multi-group transmission (low)
III-H Ratio of the multi-group transmission (high)
IV-VIII Ratio of the multi-group transmission

The invention claimed is:

1. A method for the control of a drive train (1) of a vehicle equipped with a motor (2), a multi-group transmission (4), an output means, and a control apparatus, the multi-group transmission (4) comprising at least one automatic transmission (8) and a subsequently connected range group (9), and whereby, upon a change of ratio in the range group (9) the drive train (1) is relieved of load by means of a change of a torque ($m_{mot}$) of the motor 2;
  closing a closable shifting element (24, 25) of the range group;
  synchronizing and opening an openable shifting element (24, 25) of the range group (9);
  changing a ratio of the automatic transmission (8) in such a manner, that a change in ratio of the multi-group transmission (4) is less than that of an unassisted change of ratio of the range group (9);and
  adjusting a speed of rotation ($n_{mot}$) of the motor (2) by changing a power transfer capability of at least one shifting element of the automatic transmission (8) to a connective speed of rotation ($n_{mot-a}$) equivalent to a synchronized speed at the ratio of the multi-group transmission (4) at which the closable shifting element (24, 25) of the range group (9) is synchronized.

2. The method according to claim 1, further comprising the step of satisfying a demand of a driver ($m_{mot-f}$) for changing the torque ($m_{mot}$) of the motor (2) during the changing of the ratio of the range group (9) upon conclusion of the ratio changing, whereby the control apparatus institutes a change of the motor torque ($m_{mot}$) of the driving machine (2) to relieve the drive train (1) load.

3. The method according to claim 1, further comprising the step wherein for establishment of connective speed of rotation ($n_{mot-a}$) of the motor (2) a capability of transfer from openable shifting elements of the automatic transmission (8) is reduced and a capability of transfer of closable shifting elements of the automatic transmission (8) is increased.

4. The method according to claim 1, further comprising the step wherein upon existence of a connective speed of rotation ($n_{mot-a}$) of the motor (2), a capability of transfer of the openable shifting elements of the automatic transmission (8) is cancelled, while the closable shifting elements of the automatic transmission (8) are held in a slipping state.

5. The method according to claim 1, further comprising the step wherein the closable shifting elements of the automatic transmission (8) and the closable shifting element (24, 25) of the range group (9) are completely closed when in a synchronized condition.

6. The method according to claim 1, further comprising the step wherein the change of ratio of the range group (9) and an associated change of the ratio of the automatic transmission (8) is done automatically upon presence of a defined operational condition.

7. The method according to claim 1, further comprising the step wherein the change of ratio of the range group (9) and an associated change of ratio of the automatic transmission (8) is done by the expressed, optional action of a driver.

8. The method according to claim 1, further comprising the step wherein the control apparatus is composed of a motor torque control device, an automatic transmission control device, a range group control device, which, are communicatively bound to one another and exchange signals, or the automatic transmission control device and the range group control device are mutually combined to form a common control apparatus.

9. A method for the control of a drive train (1) of a motor vehicle having including a motor (2), a multi-group transmission (4), an output shaft, and a control device, the multi-group transmission (4) comprising at least one automatic transmission (8) and a subsequently connected range group (9), the method comprising the steps of:
  relieving the drivetrain (1) of a torque load during a change of ratio in the range group (9) by changing a torque output ($m_{mot}$) of the motor 2;
  actuating a closable shifting element (24, 25) of the range group;
  synchronizing and opening an openable shifting element (24, 25) of the range group (9);
  adjusting a speed of rotation ($n_{mot}$) of the motor (2) by changing a power transfer capability of at least one shifting element of the automatic transmission (8) to a desired connective speed of rotation ($n_{mot-a}$) substantially equivalent to synchronized speed at the ratio of the multi-group transmission (4) at which the closable shifting element (24, 25) of the range group (9) is synchronized; and
  suppressing a driver demand ($m_{mot-f}$) for changing the torque ($m_{mot}$) of the motor (2) during the changing of the ratio of the range group (9) until conclusion of the range group (9) ratio change, whereupon the control device institutes a change of the motor torque ($m_{mot}$) of the driving machine (2).

10. A method for the control of a drive train (1) of a motor vehicle having including a motor (2), a multi-group transmission (4), an output shaft, and a control device, the multi-group transmission (4) comprising at least one automatic transmission (8) and a subsequently connected range group (9), the method comprising the steps of:
  relieving the drive train (1) of a torque load during a change of ratio in the range group (9) by changing a torque output ($m_{mot}$) of the motor 2;
  actuating a closable shifting element (24, 25) of the range group;
  synchronizing and opening an openable shifting element (24, 25) of the range group (9); and
  adjusting a speed of rotation ($n_{mot}$) of the motor (2) by changing a power transfer capability of at least one shifting element of the automatic transmission (8) to a desired connective speed of rotation ($n_{mot-a}$) substantially equivalent to synchronized speed at the ratio of the multi-group transmission (4) at which the closable shifting element (24, 25) of the range group (9) is synchronized.

11. The method for the control of a drive train (1) of a motor vehicle as set forth in claim 10 further comprising the step of suppressing a driver demand ($m_{mot-f}$) for changing the torque ($m_{mot}$) of the motor (2) during the changing of the ratio of the range group (9) until conclusion of the range group (9) ratio change, whereupon the control device institutes a change of the motor torque ($m_{mot}$) of the driving machine (2).

* * * * *